Patented July 11, 1950

2,515,160

UNITED STATES PATENT OFFICE 2,515,160

PRODUCTION OF PYRAZOLES

John W. Copenhaver, Easton, Pa., assignor to General Aniline & Film Corporation, New York, N. Y., a corporation of Delaware No Drawing. Application December 21, 1946, Serial No. 717,820

7 Claims. (Cl. 260—310)

This invention relates to an improved process for producing pyrazoles by reacting an acetal, including ketals, of a 1,3-oxocarbonylic compound with a hydrazine.

I have found that pyrazole and its derivatives are obtained in good yield when an acetal (or ketal) of a 1,3-oxocarbonylic compound is reacted with a hydrazine. This reaction can be illustrated by the following general equation:

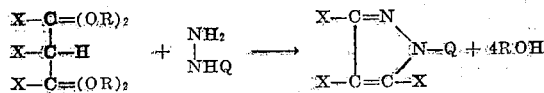

wherein Q is hydrogen, an aliphatic or an aromatic radical, X is hydrogen or hydrocarbon and R is the hydrocarbon residue of an alcohol or a phenol.

As is apparent from the above equation, pyrazole may readily be produced by reacting an acetal of malonaldehyde with hydrazine or hydrazine hydrate and a wide variety of substituted pyrazoles may be obtained by selection of the particular 1,3-oxocarbonylic compound whose acetal is employed and/or the particular hydrazine to be employed in the reaction.

As examples of acetals of 1,3-oxocarbonylic compounds which can be employed in practicing the process of the present invention may be mentioned tetramethyl malonaldehyde acetal, methyl triethyl malonaldehyde acetal, di-(1,3,3-triethoxy)-propyl ether, 1,1,3,3-tetramethoxy butane, 1,1,3,3-tetraethoxy heptane, 1,1,3,3-tetramethoxy-1-phenyl propane, 1,1,3,3-tetramethoxy-2-phenyl propane and 1,1,3,3-tetramethoxy-2-ethyl butane.

As is apparent from the nature of the reaction, the substituents of the carbon atoms of the pyrazole formed in the reaction will correspond to the substituents of the carbon atoms of the 1,3-oxocarbonylic compound which is employed in the reaction. Since an alcohol is formed as a by-product in the reaction, it is preferable for practical purposes to employ the lower alkyl acetals (methyl or ethyl) of 1,3-oxocarbonylic compounds in practicing the invention, as indicated by the above examples. However, the nature of the alcohol residue in the acetal employed is not critical as it does not enter into the reaction and hence other acetals of 1,3-oxocarbonylic compounds of the type described are operative and may be employed, if desired. The acetals of 1,3-oxocarbonylic compounds can be prepared conveniently by reacting an orthoester with an α, β-ethylenically-unsaturated ether in the presence of an acid-reacting condensing agent, as described in my copending application Serial No. 719,113, filed December 28, 1946.

Likewise, the particular hydrazine which is employed in practicing the process of this invention will, of course, depend on the type of substituent desired on the imino nitrogen. Examples of hydrazines which may be employed in the process include hydrazine, hydrazine hydrate, phenyl hydrazine, o-chlorophenyl hydrazine, p-chlorophenyl hydrazine, 2,5-dichlorophenyl hydrazine, o-, m- and p-bromophenyl hydrazines, 2,4-dibromophenyl hydrazine, 2- and 4-iodophenyl hydrazine, o-, m- and p-nitrophenyl hydrazine, 2-chloro-4-nitrophenyl hydrazine, 2,4,6-trinitrophenyl hydrazine, o-, m- and p-tolyl hydrazine, 2-bromo-4-methylphenyl hydrazine, benzyl hydrazine, α- and β-naphthyl hydrazine, methyl hydrazine, ethyl hydrazine, butyl hydrazine and isobutyl hydrazine, etc.

The reaction is advantageously carried out by dissolving the reactants, acetal and hydrazine, in a suitable acidified solvent, for instance a water-soluble alcohol such as methanol, ethanol, isopropanol, etc., either alone or in admixture with water, which has been made acid by the addition of a sufficient amount of an acidic substance such as hydrochloric acid, hydrobromic acid, sulphuric acid, boron trifluoride, etc. so as to make the reaction mixture acid. The reaction proceeds readily at room temperature, but the time of reaction may be shortened by heating and temperatures up to reflux temperature of the reaction mixture or higher temperatures, obtainable by carrying out the reaction under superatmospheric pressure, may be employed.

Several preferred specific embodiments of the present invention are illustrated by the following specific examples in which the parts are by weight. It will be understood, of course, that the invention is not limited to these examples.

*Example 1*

A mixture of 1.5 parts of 2,4-dinitrophenyl hydrazine, 2 parts of methyl triethyl malonaldehyde acetal and 2 parts of concentrated hydrochloric acid dissolved in 80 parts of 95% ethanol were heated under reflux. The red colored solution gradually became lighter and after 5 minutes refluxing was a canary yellow. Upon dilution of the reaction mixture with water, a light yellow crystalline compound melting at 107–109° C. was obtained. Analysis: Calculated for 2,4-dinitrophenyl pyrazole ($C_9H_6N_4O_4$): C, 46.16; H, 2.58; N, 23.93. Found: C, 46.45; H, 2.79; N, 23.69.

Example 2

A mixture of 57.5 parts of methyl triethyl malonaldehyde acetal, 15 parts of hydrazine hydrate and 25 parts of concentrated hydrochloric acid was dissolved in 75 parts of water and allowed to stand at room temperature for 1 hour. During this period, considerable heat was evolved and after the reaction appeared to be complete, as evidenced by a drop in temperature, 100 parts of a mixture of the alcohol and water were distilled from the reaction mixture under reduced pressure. The residue obtained was made alkaline with sodium hydroxide solution and the aqueous solution obtained was concentrated to a slurry under reduced pressure. Upon distillation, there was obtained 10 parts of pyrazole boiling at 110-113° C./7 mm. which solidified upon standing. After recrystallization from petroleum ether, the product melted at 66-68° C. Analysis: Calculated for $C_3H_4N_2$: C, 52.93; H, 5.92; N, 41.16. Found: C, 51.46; H, 5.83; N, 40.20.

Example 3

A mixture of 1.5 parts of 2,4-dinitrophenyl hydrazine, 2 parts of di-(1,3,3-triethoxy propyl)-ether and 2 parts of concentrated hydrochloric acid dissolved in 80 parts of 95% ethyl alcohol was heated under reflux for 5 minutes. Upon cooling, there was obtained 2,4-dinitrophenyl pyrazole, identical with that obtained in Example 1.

I claim:

1. The process of producing pyrazoles, which comprises reacting in an acid medium a diacetal of a 1,3-oxocarbonylic compound with a hydrazine of the formula:

$$\begin{array}{c} NH_2 \\ | \\ NHQ \end{array}$$

wherein Q stands for a member of the group consisting of hydrogen, and aliphatic and aromatic radicals.

2. The process of producing pyrazoles, which comprises reacting in an acid medium a lower alkyl di-acetal of a 1,3-oxocarbonylic compound with a hydrazine of the formula:

$$\begin{array}{c} NH_2 \\ | \\ NHQ \end{array}$$

wherein Q stands for a member of the group consisting of hydrogen, and aliphatic and aromatic radicals.

3. The process of producing pyrazoles and N-substituted pyrazoles, which comprises reacting in an acid medium a lower alkyl di-acetal of malonaldehyde with a hydrazine of the formula:

$$\begin{array}{c} NH_2 \\ | \\ NHQ \end{array}$$

wherein Q stands for a member of the group consisting of hydrogen, and aliphatic and aromatic radicals.

4. The process of producing pyrazoles, which comprises reacting in an acid medium a lower alkyl di-acetal of malonaldehyde with hydrazine.

5. The process of producing N-phenyl pyrazole, which comprises reacting in an acid medium a lower alkyl di-acetal of malonaldehyde with phenyl hydrazine.

6. The process of producing pyrazoles, which comprises reacting in an acid medium a lower alkyl di-acetal of a 1,3-oxocarbonylic compound with hydrazine.

7. The process of producing N-phenyl pyrazole, which comprises reacting in an acid medium a lower alkyl di-acetal of a 1,3-oxocarbonylic compound with phenyl hydrazine.

JOHN W. COPENHAVER.

REFERENCES CITED

The following references are of record in the file of this patent:

UNITED STATES PATENTS

| Number | Name | Date |
|---|---|---|
| 1,879,210 | Hahl | Sept. 27, 1932 |